United States Patent
Zhang et al.

(10) Patent No.: US 11,720,068 B2
(45) Date of Patent: Aug. 8, 2023

(54) AUTONOMOUS INDUSTRIAL PROCESS CONTROL SYSTEM AND METHOD THAT PROVIDES AUTONOMOUS RETRAINING OF FORECAST MODEL

(71) Applicant: Petuum Inc., Pittsburgh, PA (US)

(72) Inventors: Hongbao Zhang, Santa Clara, CA (US); Roey Flor, Pittsburgh, PA (US); Dian Li, Pittsburgh, PA (US); Adam Schwab, Pittsburgh, PA (US); Pengtao Xie, Pittsburgh, PA (US); Eric Xing, Pittsburgh, PA (US)

(73) Assignee: OPRO.AI INC., Los Altos, CA (US)

( * ) Notice: Subject to any disclaimer, the term of this patent is extended or adjusted under 35 U.S.C. 154(b) by 886 days.

(21) Appl. No.: 16/735,399

(22) Filed: Jan. 6, 2020

(65) Prior Publication Data
US 2021/0208545 A1 Jul. 8, 2021

(51) Int. Cl.
G06N 3/126 (2023.01)
G06N 20/00 (2019.01)
G06N 3/08 (2023.01)
G06N 5/04 (2023.01)
G05B 13/02 (2006.01)
G05B 13/04 (2006.01)

(52) U.S. Cl.
CPC ....... *G05B 13/0265* (2013.01); *G05B 13/042* (2013.01); *G06N 3/08* (2013.01); *G06N 3/126* (2013.01); *G06N 5/04* (2013.01); *G06N 20/00* (2019.01)

(58) Field of Classification Search
None
See application file for complete search history.

(56) References Cited

U.S. PATENT DOCUMENTS 10,481,579 B1 * 11/2019 Putman ............... G06Q 10/0639
2017/0102678 A1 * 4/2017 Nixon ..................... G05B 17/02
2019/0156241 A1 * 5/2019 Hughes ................... G06F 16/25

OTHER PUBLICATIONS

Zou, Hongbo, et al. "Validate and Enable Machine Learning in Industrial AI." arXiv preprintarXiv:2012.09610 (2020). (Year: 2020).*
Augenstein, Christoph, et al. "A Generic Architectural Framework for Machine Learning on Data Streams." Enterprise Information Systems: 21st International Conference, ICEIS 2019, Heraklion, Crete, Greece, May 3-5, 2019, Revised Selected Papers 21. Springer International Publishing, 2020. (Year: 2019).*
Baldominos, Alejandro, and Yago Saez. "Coin. AI: A proof-of-useful-work scheme for blockchain-based distributed deep learning." Entropy 21.8 (2019): 723. (Year: 2019).*

(Continued)

*Primary Examiner* — Daniel T Pellett
(74) *Attorney, Agent, or Firm* — MagStone Law, LLP; Enshan Hong

(57) ABSTRACT

The current disclosure is directed towards system and method for controlling industrial process. In one example, a method comprising deploying a forecast model for controlling an industrial process with training configurations that can be used as a single point of truth for guiding training and retraining versions of the forecast model using a model training algorithm without human input. The retraining and redeployment of the forecast model may be triggered when the performance of the forecast model degrades.

20 Claims, 7 Drawing Sheets

(56) References Cited

OTHER PUBLICATIONS

Oberhofer, Martin, Lars Bremer, and Mariya Chkalova. "Machine Learning Applied to the Clerical Task Management Problem in Master Data Management Systems." BTW 2019 (2019). (Year: 2019).*

Dai, Wei, et al. "Petuum: A framework for iterative-convergent distributed ml." arXiv preprint arXiv:1312.7651 1.2.1 (2013). (Year: 2013).*

Pang, Candy, and Duane Szafron. "Single source of truth (SSOT) for service oriented architecture (SOA)." Service-Oriented Computing: 12th International Conference, ICSOC 2014, Paris, France, Nov. 3-6, 2014. Proceedings 12. Springer Berlin Heidelberg, 2014. (Year: 2014).*

Precup, Radu-Emil, et al. "An overview on fault diagnosis and nature-inspired optimal control of industrial process applications." Computers in Industry 74 (2015): 75-94. (Year: 2015).*

Renggli, Cedric, et al. "Continuous integration of machine learning models with ease, ml/ci: Towards a rigorous yet practical treatment." Proceedings of Machine Learning and Systems 1 (2019): 322-333. (Year: 2019).*

Wuest, Thorsten, et al. "Machine learning in manufacturing: advantages, challenges, and applications." Production & Manufacturing Research 4.1 (2016): 23-45. (Year: 2016).*

Xing, Eric P., et al. "Petuum: A new platform for distributed machine learning on big data." Proceedings of the 21th ACM SIGKDD International Conference on Knowledge Discovery and Data Mining. 2015. (Year: 2015).*

Zhu, Xudong, Hui Li, and Yang Yu. "Blockchain-based privacy preserving deep learning." Information Security and Cryptology: 14th International Conference, Inscrypt 2018, Fuzhou, China, Dec. 14-17, 2018, Revised Selected Papers 14. Springer International Publishing, 2019. (Year: 2019).*

\* cited by examiner

AUTONOMOUS INDUSTRIAL PROCESS CONTROL SYSTEM AND METHOD THAT PROVIDES AUTONOMOUS RETRAINING OF FORECAST MODEL

TECHNICAL FIELD

The present description relates generally to a fault tolerant control system, and more particularly to a fault tolerant machine learning-based control system that can automatically provide optimal suggestions for controlling an industrial process.

BACKGROUND

Industrial processes are essential to global economy. However, they are often hazardous and dangerous to run. A fault tolerant and fully automated industrial process control system can help to ensure optimal operation conditions at all time and consequently help to maximally reduce pollutants, labor and material costs, and improve safety and product quality and yield, etc. Applicants herein realized that the following challenges need to be addressed to achieve successful automated industrial process control:

(1) Industrial processes are often volatile and have narrow safe operation zones. Performing actual experiments on the real system can be dangerous or impossible. The industrial process control system needs to be able to ascertain the optimal operation parameters or optimal conditions without having to perform actual experiments on the real system.

(2) The operating conditions of industrial process can quickly become dangerous. For example, system pressure can build up quickly (e.g., in less than 10 seconds) to a dangerous point due to rapid increase in gas production as a result of a slight increase in operating temperature. The industrial process control system needs to have low latency and can quickly adapt to fast changing operating conditions.

(3) Industrial process sensors often operate in extreme conditions, such as extreme temperature, pressure, and pH. Sensor drift due to degradation is a common problem and can lead to inaccurate sensor reading. Sensor failure can also occur and lead to missing sensor data. The industrial process control system needs to be able to automatically and efficiently remove or mask faulty or missing sensor data and automatically and quickly fine-tune forecast model to adapt to sensor data drift.

(4) Industrial process system dynamics can quickly change due to for example rapid equipment degradation or failure. The industrial process control system needs to be able to automatically, quickly, consistently and repeatedly train and retrain forecast model without introducing additional human bias or requiring additional human input.

(5) Each industrial process operator may have hundreds of plants or factories, each plant or factory may be running multiple industrial processes, and each industrial process may utilize hundreds and thousands of sensors. As such, an ideal industrial process control system needs to able to execute at scale to accommodate variable and large amounts of data processing for each operator.

SUMMARY

In one aspect, the present approach leverages a machine learning forecast model that captures the system dynamics of industrial process and an optimization search algorithm that can be used to search through the control space of the forecast model to provide optimal suggestion for controlling the running of the industrial process. As such, virtual experiments (i.e., calculations) may be performed on the forecast model using the optimization search algorithm to find an optimal set of industrial process control parameters to achieve one or more operation objectives instead of performing actual experiments on the real industrial process system, which may be dangerous, impossible, slow and/or costly to perform. In some implementations, the machine learning forecast model is trained using historical industrial process data as training data.

In one aspect, the present approach provides techniques that enable the forecast model to be automatically and repeatedly trained and deployed while guided only by a configuration file containing a set of machine learning configurations and model deployment configurations without human input. The retraining and re-deployment of the forecast model may be initiated automatically when the forecast model performance degrades, or when a triggering event has occurred (e.g., equipment has been replaced).

In one aspect, the present approach provides a computer implemented method for providing optimal suggestion for controlling industrial process using a forecast model. The method includes (1) deploying a forecast model with a set of model training configurations to a production environment to predict optimal suggestion for controlling industrial process, where the set of model training configurations is used as a single point of truth for guiding the training of the forecast model using a model training algorithm, and where an optimization search algorithm is used to search through the dynamic space of the forecast model to predict an optimal set of control parameters for controlling the industrial process to achieve one or more operation objectives of the industrial process; (2) deploying a first version of the forecast model trained using the set of model training configurations to predict optimal suggestion for controlling the industrial process, (3) monitoring the performance of the first version of the forecast model on current industrial process data of the industrial process, (4) if the performance of the first version of the forecast model becomes unsatisfactory, retraining a second version of the forecast model on current industrial process data with the set of model training configurations as a single point of truth for guiding the forecast model training using the model training algorithm, and (5) deploying the second version of the forecast model to replace the first version of the forecast model to predict optimal suggestion for controlling the industrial process with the set of model training configurations.

In one aspect, the set of model training configurations for training the forecast model has been validated as can consistently train accurate versions of the forecast model when used as a single point of truth for guiding the forecast model training on different training data sets using a model training algorithm without human input. In one aspect, to validate a set of model training configurations, the model training configurations is used as a single point of truth to guide the model training algorithm to train instances of the forecast model on different training data sets without human input. If the prediction performance of the instances of the forecast model trained on different training data sets are consistently satisfactory, the set of model training configurations is validated.

In one aspect, the set of model training configurations is generated manually by a machine learning engineer, or alternatively, according to another aspect, the set of model training configurations is automatically generated by an optimization search algorithm. For example, to obtain a set of model training configurations that can consistently train accurate versions of a forecast model, the method performs the steps of (1) generating a population of model training configurations sets (e.g., randomly or based on a knowledge database), (2) using a genetic algorithm, repeatedly selecting and mutating winning population of the sets of model training configurations until an single optimal set of model training configuration is found.

In one aspect, for the step of deploying a forecast model to a production environment to predict optimal suggestion for controlling an industrial process, the method performs the steps of (1) packaging the forecast model for deployment, where the packaged forecast model includes or points to a configuration file containing the set of model training configurations and a set of model deployment parameters, and (2) running a deployment script to make various calls through a set of interfaces to automatically readying (e.g., installing necessary software) the forecast model for performing model inferencing in the production environment without human writing software codes.

In one aspect, to deploy a version of the forecast model using the set of model training configurations to predict optimal suggestion for controlling the industrial process, the method performs the steps of (1) gathering and processing real-time industrial process data (e.g., as time-series data) of the industrial process to generate current model deployment data for use by the forecast model to predict optimal suggestion for controlling the industrial process, including removing noise, outlier and invalid data, selecting valid ranges or windows of industrial process data across multiple tags, aligning industrial process data across multiple tags, and filling in missing data points (e.g., via interpolation), and (2) using the current model deployment data as forecast model constraint to predict optimal suggestion (e.g., control settings) for controlling the industrial process to achieve one or more operation objectives. In one example, the method uses a genetic algorithm to search through the dynamic space of the forecast model to predict an optimal solution (e.g., optimal suggestion such as optimal control settings) for a set of inputs or constraints (e.g., operation objectives, safe operation zone boundary).

In one aspect, to monitor the performance of a version of the forecast model on current industrial process data of the industrial process, the method performs the steps of (1) gathering and processing real-time industrial process data (e.g., as time-series data) of the industrial process to generate current model deployment data for use by the forecast model to predict optimal suggestion for controlling the industrial process, where the processing includes removing noise, outlier and invalid data, selecting valid ranges or windows of industrial process data across multiple tags, aligning industrial process data across multiple tags, and filling in missing data points by performing data interpolation, and (2) using the current processed industrial process data (e.g., model deployment data) to check the prediction performance of the deployed version of the forecast model.

In one aspect, for if the performance of the first version of the forecast model becomes unsatisfactory, retraining a second version of the forecast model on current industrial process data with the set of model training configurations as a single point of truth for guiding the forecast model training using the model training algorithm without human input, the method performs the steps of (1) gathering and processing real-time industrial process data (e.g., as time-series data) of the industrial process to generate current model training data (e.g., training data set and validation data set) for use by the forecast model to predict optimal suggestion for controlling the industrial process, including removing noise, outlier and invalid data, selecting valid ranges or windows of industrial process data across multiple tags, and aligning industrial process data across multiple tags, and filling in missing data points (e.g., via data interpolation), and (2) using the set of model training configurations (e.g., as a configuration file) as a single point of truth to guide automatic training of the second version of the forecast model using the model training algorithm on the current model training data.

In one aspect, an example control system of automatically providing optimal suggestion for controlling an industrial process is provided. The system includes one or more processors, memory coupled to the one or more processors, computer instructions stored in the memory which when executed by the one or more processors, perform the various functions or methods of the system. The system may also additionally include sensors, controllers, and equipment for running the industrial process. When functionally described, the system includes the components of plant database, ETL module, tag evaluation service, machine learning environment, deploy service, and production environment.

Plant database functions as a data librarian for storing real-time industrial process data and as a database that stores historical industrial process data. The stored data includes raw data and metadata associated with the raw data. The plant database may be a customer database under customer control and local to customer's plants. The plant database may be coupled to a plant control system that controls the running of the industrial process. In one aspect, the plant control system may automatically adjust control settings based on the optimal suggestion.

Connected to plant database, ETL module (data extract transform and load module) functions to transform the industrial process data retrieved from the plant database from their variate data formats to a common data format readily manipulatable by the system. Controlled by a timer, ETL module performs the tasks of retrieving the industrial process data from plant database, storing a copy of the retried industrial process data in replicate database, transforming the industrial process data from variate data formats to an intermediate data format (e.g., .csv file), and uploading the transformed data to a custom database in a custom schema (e.g., PostgreSQL database schema) developed for easy data query for forecast model training.

Tag evaluation service, again controlled by a timer/trigger/scheduler, processes the industrial process received from the custom database to improve data quality of the industrial process. The tag evaluation service is configured to (1) connect and execute queries on the custom database to retrieve the industrial process data, (2) process the industrial process data to improve data quality by removing noise and outlier, aligning data across multiple tags and filling in missing data by performing data interpolation, and (3) present the data processing results for user validation via a tag evaluation GUI, through which a user can review, modify, accept, and/or reject the data processing results, and (4) store the user validated data processing results back to the custom database as metadata associated with the industrial process data. Particularly, the data processing results stored as metadata indicate the valid windows of industrial process data.

The machine learning environment executes a machine learning pipeline which includes a machine learning module, a model training controller, and a model training interface.

Controlled by model training controller, the machine learning module trains the forecast model. The set of machine learning configurations serves as a single point of truth for guiding and controlling the training of the forecast models using a model training algorithm without human input. The trained forecast model captures the system dynamics of the industrial process and can be used to predict or inference various parameters of the industrial process including optimal suggestion for controlling the running of the industrial process.

The set of machine learning configurations for training the forecast model may be generated manually by for example a machine learning engineer, or alternatively, the set of model training configurations is automatically generated by an optimization search algorithm. For example, to obtain a set of model training configurations that can accurately train versions of a forecast model, the method performs the steps of (1) generating a population of model training configurations sets (e.g., randomly or based on a knowledge database), (2) using a genetic algorithm, repeatedly selecting and mutating winning population of the sets of model training configurations until a single optimal set of model training configuration is found.

Controlled by a timer/trigger/scheduler, periodically or at occurrence of a predefined condition, or through a control line interface, the model training controller scans a configuration file repository for any new or updated configuration file containing new or updated set of model training configurations a user may have generated, submitted and/or requested for release in the model training interface, or an algorithm (e.g., genetic algorithm) may have automatically generated and optimized. Upon receiving the new or updated configuration file, the model training controller requests the current training data to be sent from the custom database to the machine learning module, initiates forecast model training by the machine learning module using the new or updated configuration file and the current training data, which results in one best checkpoint (e.g., a single optimal forecast model checkpoint) trained across epochs. The model training controller evaluates the performance of versions of forecast models trained until an optimal version of forecast model with satisfactory performance metrics is found and approved for deployment. The model training controller publishes the approved forecast model as a docker image associated with the forecast model in a central docker image repository. Each forecast model corresponds to a docker image in the central docker image repository.

Controlled by a timer/trigger/scheduler, deploy service is configured to (1) scan the docker image repository for a newly approved version of the forecast model, (2) execute a deployment script to (a) create a deployment project for the newly approved version of the machine learning model by making calls through a set of interfaces, (b) update the deployment project with user defined hierarchical environment tags defining development, quality assurance, and production, (c) upload the deployment project to a the production environment, and (d) trigger a tag builder to create desired tags, file structures and dashboards in the replicate database according to the environment tags.

Production environment comprises a serving pipeline, wherein the serving pipeline comprises (1) a producer, (2) a consumer, and (3) an infrastructure layer which includes a messaging service, metrics collection and storage service, and log collection and storage service. The message service is configured to publish messages to topics, wherein the log collection and storage service is configured to collect and store logs from deployed services, and wherein the metrics collection and storage service is configured to publish and store metrics, Producer is configured to convert data from a message stream of the replicate database into a message stream within the messaging service, wherein the producer comprises a web API client for opening up a desired websocket connection for tags read from a configuration file stored in the corresponding docker image of the forecast model, where the producer further comprises a client configured to publish and subscribe messages to topics within the messaging service. In one aspect, the producer is an ETL layer for transmitting Web Socket data into internal events.

Consumer is configured to cache a configurable window size of industrial data read in from a topic stream of the messaging service stream, communicate the configurable window size of industrial data read from the replicate database to the machine learning algorithm, and using an optimization search algorithm to search through the control space of the forecast model to automatically perform machine learning forecast model inferencing to predict various parameters of the industrial process including optimal suggestion for controlling the industrial process. The model prediction is passed on to customer or directly to the plant control system for controlling the industrial process. In one aspect, the consumer is an ETL layer baked into the serve-able model, which is saved as a docker image, to translate internal events into a data format consumable by a library. The data is passed back to the consumer directly from the serve-able model in the form of a web API.

The present approach leverages several features to increase the fault tolerance of the autonomous control of the industrial process. In one aspect, the control system addresses faulty forecast model that can no longer accurately capture system dynamics due to for example sensor and/or system dynamics drift by continuously monitoring its performance, automatically triggering its training and retraining using a set of model training configurations as a single point of truth for training and retraining of the forecast model, and automatically deploying and redeploying the trained forecast model guided by a single set of forecast model deployment configurations. In one aspect, the control system addresses faulty sensor data by processing real-time industrial process data to remove noise, outlier and invalid data, to select valid ranges or windows of industrial process data across multiple tags, to align industrial process data across multiple tags, and to fill in missing data points by performing data interpolation.

DETAILED DESCRIPTION

Figure 1:
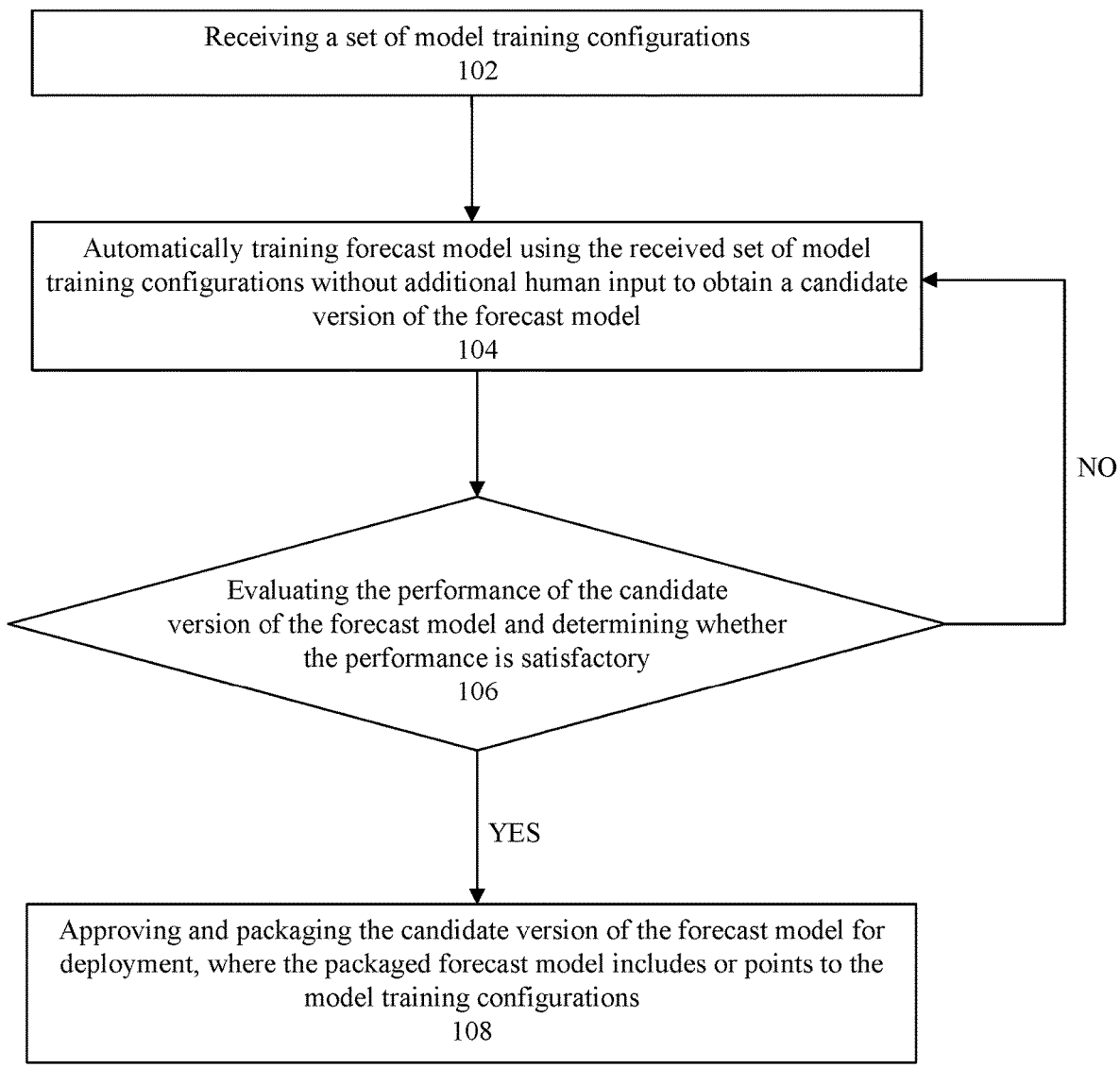
FIG. 1 illustrates a flow chart of an example method for training a forecast model for controlling industrial process.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the elements of the embodiments may be used together in various combinations.

As used herein, the terms "a" and "an" are intended to denote at least one of a particular element, the term "includes" and its variant mean includes at least, the term "or" means and/or unless the context clearly indicates otherwise, the term "based on" means based at least in part on, the terms "an implementation", "one implementation" and "some implementations" mean at least one implementation. Other definitions, explicit and implicit, may be included below.

Unless specifically stated or otherwise apparent from the following discussion, the actions described herein, such as "processing" or "computing" or calculating" or "determining" or "displaying" or "retrieving" "gathering" "presenting" "predicting" or "outputting" or "extracting", or the like and variant, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to systems or apparatus for performing the operations, processes, or steps described herein. This apparatus may be specially constructed for the required purposes, or it may comprise a general-purpose computer, whether an individual computing device or a distributed computing cluster, selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, distributed storage systems, or any type of media suitable for storing electronic instructions, and each coupled to a computer system bus.

The following description relates to techniques that automatically provide optimal suggestion for autonomous industrial process control, where a machine learning based forecast model that captures industrial process system dynamics is automatically trained and deployed repeatedly while guided only by a configuration file containing predefined machine learning and deployment configurations without human input. Once trained and deployed, the retraining and re-deployment of the forecast model may be triggered automatically, for example, when the forecast model performance degrades, or when a predefined time period has elapsed, or when a defined triggering event such as when a piece of equipment is replaced.

Figure 2:
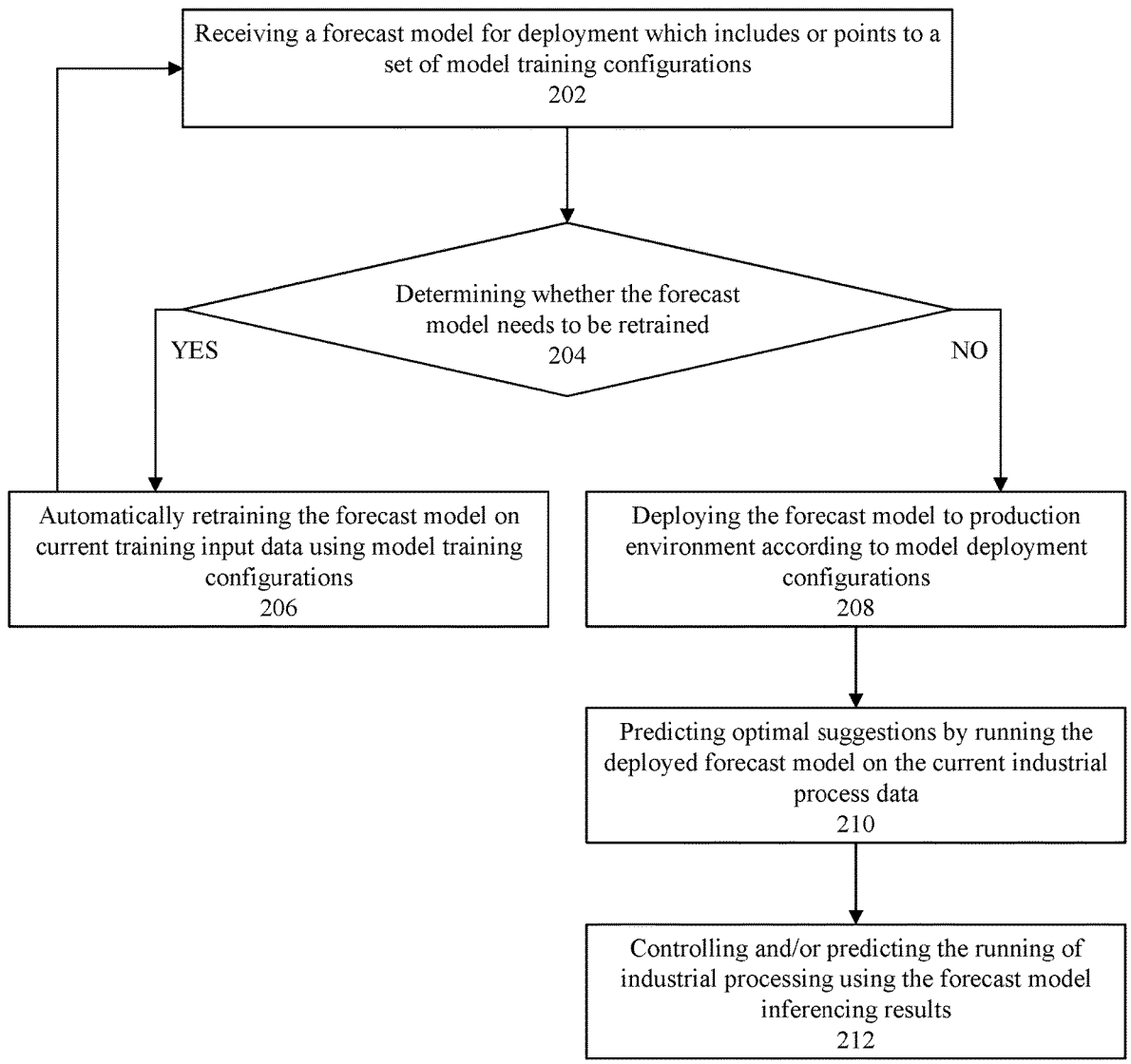
FIG. 2 illustrates a flow chart of an example method for deploying a forecast model for controlling industrial process.
Figure 3:
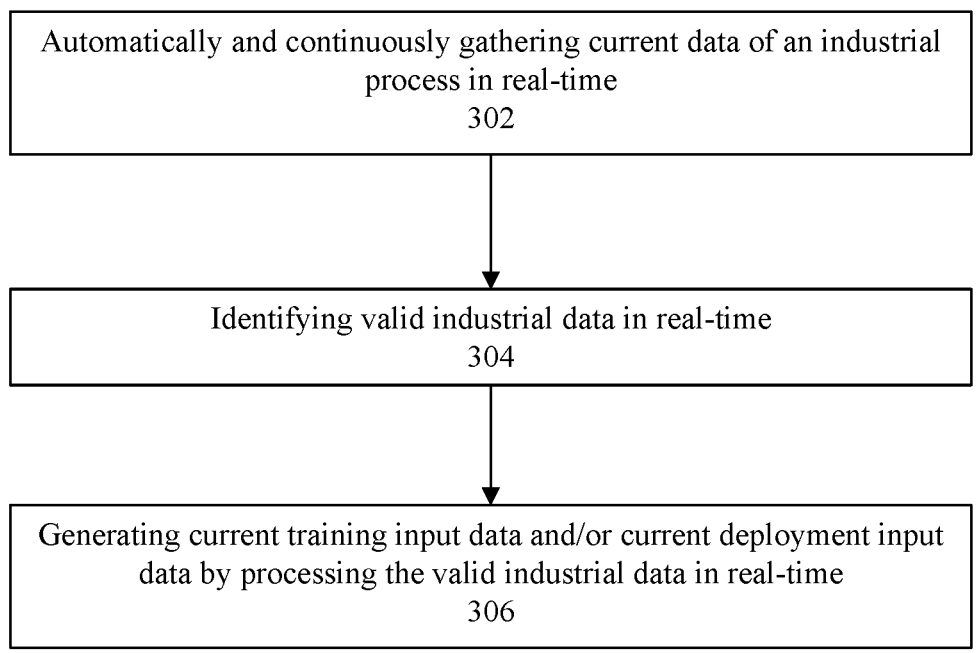
FIG. 3 illustrates a flow chart of an example method for continuously gathering and processing current data of an industrial process for use as input data for controlling industrial process.

FIGS. 1 to 3 illustrate different components of a method for automatically providing optimal suggestion for automated control of industrial process. FIGS. 4 to 7 illustrate different components of a computing system for implementing a method for automatically providing optimal suggestion for automated control of industrial process. The example method of FIGS. 1 to 3 may be implemented by any suitable computing system, which may be generally described as having one or more processors, a memory coupled to the one or more processors, and computer instructions stored in the memory which when executed by the one or more processors cause the one of more processors to perform a method for providing optimal suggestion for automated control of industrial process. The method illustrated in FIGS. 1 to 3 may be implemented by the system illustrated in FIGS. 4 to 7.

Forecast Model Training

FIG. 1 illustrates an example method 100 for automatically training a forecast model for controlling industrial process in accordance with an example embodiment of the present invention, the method includes:

At 102, receive a set of model training configurations for training a forecast model on current industrial process data for predicting various parameters of the industrial process, including optimal suggestion for controlling industrial process. The set of model training configurations can serve as a single point of truth for guiding the training of the forecast model without human input when used with a model training algorithm.

In some implementations, the forecast model may be a machine learning model trained to make time-series prediction by processing and analyzing time-based historic data sets of the industrial process. Time-series data sets may be analyzed to make predictions of various operation parameters and control parameters of the industrial process, including predicting optimal suggestion of control parameters (e.g., current or future control parameters) for achieving one or more operation objectives. The trained time-series forecast model may be used to generate predictions for consecutive time intervals, which may be successive time intervals of the time-series historic data sets.

The model training configurations may be manually generated by a data engineer, or automatically generated and fine-tuned using an optimization search algorithm. For example, a genetic search algorithm automatically generates a population of model training configurations (e.g., based on a knowledge base or random mutation), repeatedly selects and mutates winning population of model training parameters until an optimal individual solution for the model training configuration parameters is found. An optimal individual solution for model training configuration parameters is found when a set of model training configurations is shown to be able to consistently train accurate forecast model versions using different training data when the set of model training configurations is used as a single point of truth for guiding forecast model training using the model training algorithm. The optimal model training configurations may be stored as a configuration file included in or linked to the forecast model it is used to train.

In some implementations, the forecast model is a machine learning forecast model, the set of model training configurations includes configurations for training a machine learning model, such as, parameters defining input and output layers, number of hidden layers, number of nodes at each layer, connections or flow of information from one node to the next, activation function at each node, and/or learning rate, etc.

The model training configurations may additionally include data processing parameters for automatic gathering and processing industrial process data, such as parameters for, tags generation, data denoising, outlier removal, data alignment, missing data handling, and/or valid data selection, etc.

At 104, automatically train the forecast model on current data of the industrial process (i.e., industrial process data) using the received model training configurations as a single point of truth for guiding the forecast model training using a model training algorithm without human input to arrive at a new candidate version of the forecast model.

The forecast model may be a machine learning model and the model training algorithm may be a machine learning algorithm. In some implementations, the current industrial process data for training the forecast model includes current real-time time-series industrial process data. To generate current industrial process data for training the forecast model, the method performs the following processing steps: (1) Continuously gather real-time industrial process data, store a duplicate copy of the gathered industrial process data. (2) Convert the industrial process data from their variate data formats to a common data to a common data format for easy handling for forecast model training and deployment. (3) Identify and select valid windows of industrial process data, (4) Clean the industrial process data, including remove low frequency, high frequency, and constant data. The reasoning is that, if the data is constant, noisy, low frequency, or high frequency, then the data may be outlier or low-quality data and may not be usable as input to forecast model for forecast model training, and thus should be excluded. In some implementations, only data that is not constant, noisy, low frequency, or high frequency are selected to be included in model training data set or model deployment input data for forecast model training or inferencing. (5) The industrial process data are aligned across multiple sensors/tags and missing data points are filled in by performing interpolation. (6) Forecast model input data such as model training data set and model validation data set may be generated using the processed current industrial process data.

When the set of model training configurations is used to as a single point of truth to guide the training of the forecast model using the model training algorithm, everything is automatically tuned without human input except for the training data used to train the forecast model, in other words, all input for training the forecast model are fixed or automatically controlled by the set of model training configurations without additional human input The training data may be continuously updated with current real-time industrial process data to ensure the trained forecast model accurately captures the current system dynamics of the industrial process.

At 106, evaluate the performance of the candidate version of the forecast model and determine whether it is satisfactory. If the performance is satisfactory, approve the candidate version of the forecast model for deployment to a production environment in step 108. If the performance is not satisfactory, return to step 104 to retrain the forecast model using the model training configurations as a single point of truth for guiding the forecast model training without additional human input to arrive at a new candidate version of the forecast model.

In some implementations, performance metrics (e.g., mean squared prediction error) of the candidate version of forecast model on current industrial process data (e.g., current validation data set) are generated, and a relative and/or absolute performance evaluation may be performed. For absolute evaluation, if the performance metrics of the candidate version of forecast model is within a threshold value, the forecast model passes absolute evaluation. For relative evaluation, the performance metrics of the candidate version of forecast model is compared to the performance metrics of an approved version of the forecast model. If the difference is within a threshold range, the new version of forecast model passes the relative evaluation. If the difference is outside of the threshold range (e.g., indicating forecast model has degraded beyond certain extend), the candidate version of forecast model does not pass the relative evaluation, since it will result in an adjustment too dramatic for the forecast model. In some implementations, forecast model is used in optimization by an optimization search algorithm as a simulator of the system. If the performance of the forecast model is not satisfactory, it means that the forecast model cannot simulate the real industrial process system operation well so that the optimization cannot provide good results either.

At 108, package the approved forecast model for deployment to a production environment, where the packaged forecast model includes or points to the set of model training parameters for training the approved forecast model. In some implementations, packaging the approved forecast model for production may include tagging the approved forecast model with various deployment parameters such as environment tags to define the various forecast model deployment parameters. In some implementations, the environment tags may be user manually defined through a user interface. In some implementations, the environment tags may be automatically generated using an algorithm (e.g., based on a knowledge base). In some implementations, the environment tags may include user manually defined environment tags and algorithm automatically generated environment tags. The environment tags may be hierarchical, beginning from parameters defining development, then quality assurance, and then production. After a forecast model is trained, it can be approved manually by a user or automatically approved. Once the forecast model is approved, it enters into the development environment. From there it can be manually promoted (e.g., to the quality assurance environment or the production environment) or rolled back. The environment tag provides a way of gathering subsets of available checkpoints per model. In some implementations, the higher the environment the more restrictive the subset of allowed checkpoints. The subset of allowed checkpoints for the production environment is more restrictive than the allowed checkpoints for the quality assurance environment, which is more restrictive than the checkpoints for the development environment. In other words, the subset of allowed checkpoints for the production environment is less than that of the quality assurance environment, which is less than that of the development environment. In some implementations, packaging the approved forecast model for production may include defining various parameters for, for example, (1) parameters controlling how industrial process data will be assembled and processed (e.g., prior to being used as input to perform forecast model inferencing), and (2) parameters controlling how an optimization search algorithm will search the dynamic space of the forecast model to produce an optimal solution given a set of input data.

Forecast Model Deployment

FIG. 2 illustrates an example method 200 of deploying a forecast model for automatically providing optimal suggestion for controlling industrial process. The forecast model may be trained using the method 100 of FIG. 1. The method 200 includes:

At 202, receive a forecast model for deployment, where the forecast model includes or points to a set of model training configurations that can serve as a single point of truth for controlling the training and retraining of the forecast model using a model training algorithm without further human input. In this way, the forecast model will be trained exactly the same way each time, including how raw industrial process data will be gathered and processed to generate forecast model training data. The only difference between each training cycle is the raw industrial process data used for that training cycle.

In some implementations, the forecast model is a machine learning forecast model, the set of model training configurations includes configurations for training a machine learning model, such as parameters defining input and output layers, number of hidden layers, number of nodes at each layer, connections or flow of information from one node to the next, activation function at each node, and/or learning rate, etc.

At 204, determine whether the forecast model needs to be retrained. If yes, proceed to step 206 to retrain the forecast model. If no, proceed to step 208 to deploy the forecast model to a production environment.

Whether the forecast model needs to be retrained may be based on the performance of the forecast model. In some implementations, performance metrics (e.g., mean squared prediction error) of the forecast model on current industrial process data are generated. Relative and/or absolute performance evaluation may be performed. For absolute evaluation, the performance metrics is compared to a predefined threshold value. The deployed forecast model passes absolute evaluation if its performance metrics is within the range set by the predefined threshold value; otherwise, the deployed forecast model does not pass absolute evaluation. For relative evaluation, the performance metrics is compared to an approved performance metrics of the forecast model. If the difference in the performance metrics is within a threshold range, the deployed forecast model passes the relative evaluation. If the difference is outside of the threshold range, the deployed version of forecast model does not pass the relative evaluation. If the forecast model performance metrics pass the evaluation, the forecast model does not need to be retrained and can be deployed to perform model inferencing in production, otherwise, it needs to be retrained.

Whether the forecast model needs to be retrained may also be determined or triggered by a timer/trigger/scheduler, and training is automatically triggered when a predefined time period has elapsed. Whether the forecast model needs to be retrained may further be determined or triggered by the occurrence of one or more predefined events, such as a particular tag data exceeds a predefined threshold value (e.g., when temperature sensor data has exceeded 800° C.), a piece of equipment has been replaced.

At 206, automatically retrain the forecast model on current training data (e.g., current training data set and validation data set generated using current industrial process data) using the set of model training configurations as a single point of truth for controlling the retraining of the forecast model using a model training algorithm without further human input, including, for example, (1) automatically gathering and processing current industrial process data to generate new training data (e.g., training data set and validation data set) for retraining the forecast model, (2) automatically training and validating the forecast model until an optimal version of forecast model is found and approved, and (3) automatically packaging and storing the approved forecast model together with a set of deployment configurations for later deployment.

In some implementations, automatically retraining the forecast model is also coupled with a rolling back of the deployment of the forecast model to remove or replace the currently deployed version of the forecast model with a different version of the forecast model for deployment. The different version of the forecast model may be a prior deployed version of the forecast model or a newly trained version of the forecast model.

At 208, deploy the forecast model to a production environment according to the set of model deployment configurations. The forecast model deployment can be automated so that software code does not have to be written by a human. Deployment can be to a single computing device, to a small-scale device, or to a large-scale, scalable, fault-tolerant web service, utilizing, for example, hundreds and thousands of standard processing blocks. The deployment may be guided by a deployment script interacting with a series of interfaces to automatically generate software codes and/or make the necessary calls to set the production environment context necessary to deploy the forecast model. For example, the deployment script may automatically (1) trigger execution of an tag building interface or script to automatically create tags, file structures, and dashboards for visualizing the data, (2) define or build an interface to retrieve, process, and forward data (e.g., data industrial process data) from a source database for performing model inferencing, and (3) define or build an interface to receive deployment data to perform data processing and inferencing using the forecast model, and (4) forward the inference results (e.g., optimal suggestion) back to customer for controlling the running of the industrial process.

At 210, use the deployed forecast model to predict various parameters of the industrial process, including optimal suggestion for controlling industrial process, using current deployment data.

Industrial process data are automatically and continuously gathered and processed from a source database in real-time (e.g., valid data range selected, normalized and denoised, outliers removed, data aligned across tags, missing data filled, and/or unnecessary data removed, etc.) to generate deployment data to be used by the forecast model to perform inferencing. An optimization search algorithm (e.g., genetic algorithm) may be used to search through the dynamic space of the forecast model to find optimal suggestion for a given set of inputs. For example, cleaned and processed real-time valid industrial process data (e.g., valid data range selected, normalized, denoised, outliers removed, data aligned across tags, missing data filled, and/or unnecessary data removed, etc.) are fed into a consumer together with a desired future state (e.g., operation objectives) of the industrial process (e.g., maximizing yield), a genetic algorithm is used to search the entire dynamic space of the forecast model to find an optimal solution (i.e., optimal suggestion) for one or more control parameters or operation parameters (e.g., current air flow setting, temperature setting, and/or pressure setting) for controlling the industrial process, or to find a future state of the industrial process (e.g., yield) given the current control parameters or operation parameters (e.g., current air flow setting, temperature setting, and/or pressure setting).

At 212, control and/or predict the running of industrial process using the forecast model inferencing results (e.g., predicted optimal suggestion for controlling the industrial process). The customer may manually adjust control parameters and/or operation parameters of the industrial process based on the inferencing results. A plant control system may automatically act on the forecast model inferencing results to control the running of the industrial process (e.g., automatically adjusting valve settings based on the predicted optimal suggestion (e.g., optimal control parameters and/or operation parameters).

Data Processing and Cleaning

FIG. 3 shows an example method 300 for automatically processing current industrial process data for model training and model deployment. The method 300 may be used to generate processed current industrial process data for use by method 100 of FIG. 1 for forecast model training and by method 200 of FIG. 2 for forecast model deployment. The gathering and processing of the current industrial process data may be continuous in real-time, triggered manually by a user, and/or triggered automatically by a timer/trigger/scheduler upon occurrence of a triggering event, such as lapse of a predefined time period, initiation of forecast model training, initiation of model inferencing. The method 300 includes:

At 302, automatically gather current data of an industrial process (i.e., current industrial process data). The industrial process data may be (1) retrieved from a plant database of a customer, (2) converted from variate data formats to a common data format that is easy for performing forecast model training and/or inferencing, (3) denoised (e.g., low frequency noise, high frequency noise and spikes removed), (4) aligned across multiple sensors/tags and missing data filled in through data interpolation, and (5) processed to remove invalid industrial process data (e.g., industrial process data measured when the plant is down).

At 304, identify and select valid industrial process data. In some implementations, valid windows of industrial process data across multiple tags are automatically identified and selected based on a sliding window approach and using several data criteria such as data being non-constant, not of low frequency (e.g., not below a low frequency threshold), or not of high frequency (e.g., not above a high frequency threshold). The reasoning is that, if the data is constant, noisy, low frequency, or high frequency, then the data may be outlier or low-quality data and may not be usable as input to forecast model for forecast model training or inferencing, and thus should be excluded. Only data that is not constant, noisy, low frequency, nor high frequency are selected to be included in model training data set or model deployment input data forecast model training or inferencing.

At 306, process the valid industrial process data to generate current training data for use as training forecast model and/or current deployment data for performing model inferencing.

Example Control System

Figure 4:
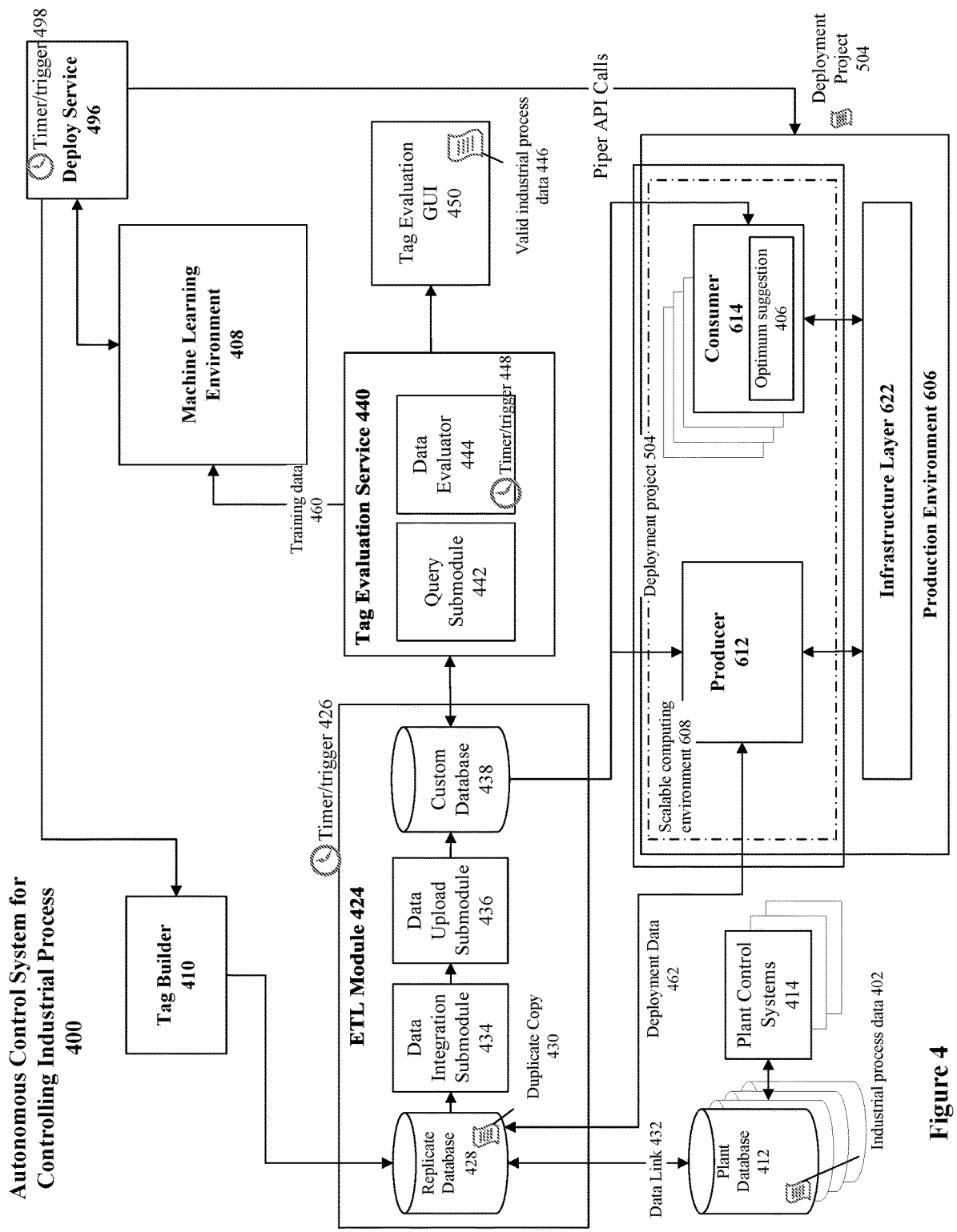
FIG. 4 illustrates a block diagram of the system architecture of a system for automatically for controlling industrial process.
Figure 5:
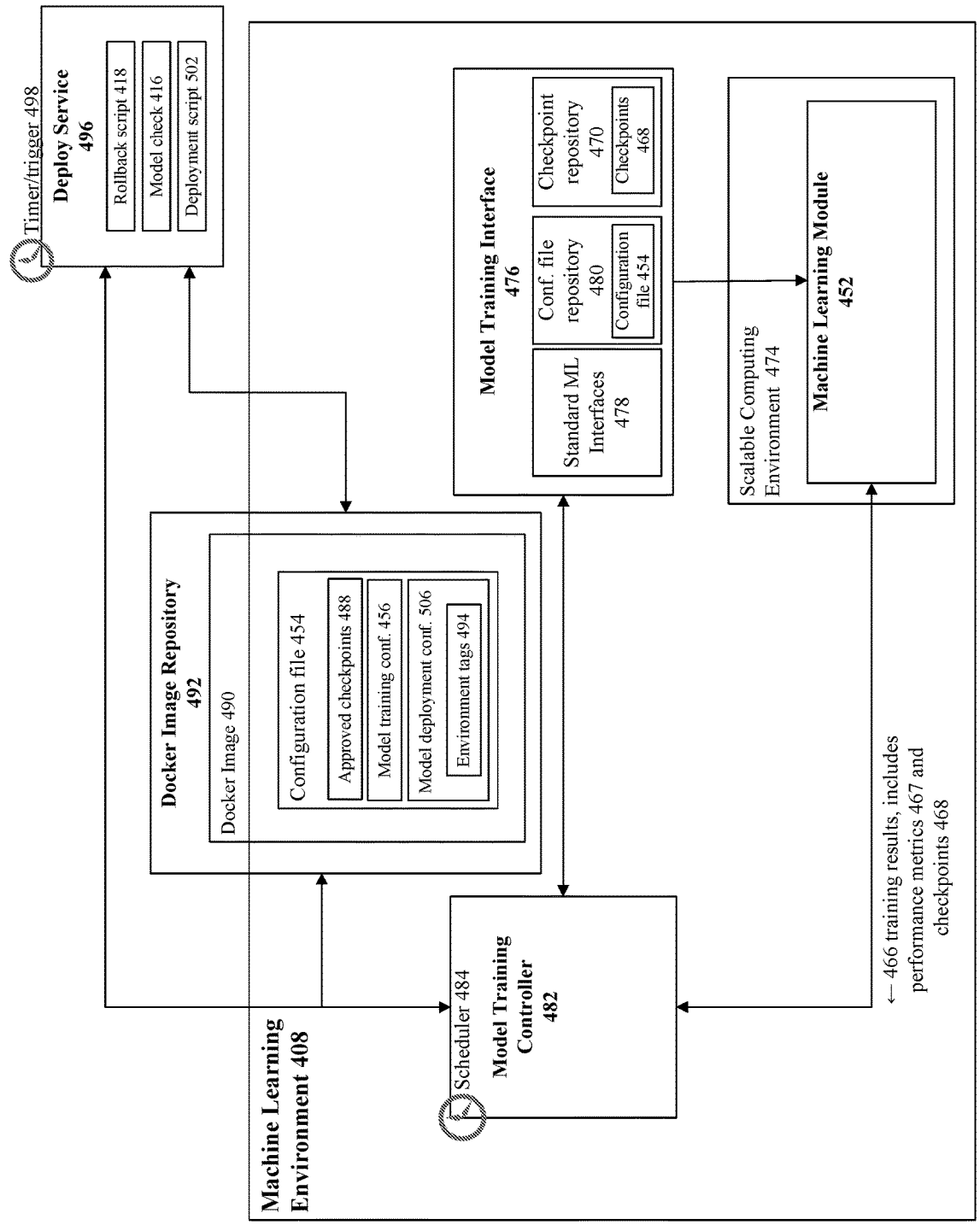
FIG. 5 illustrates a machine learning environment for controlling industrial process.
Figure 6:
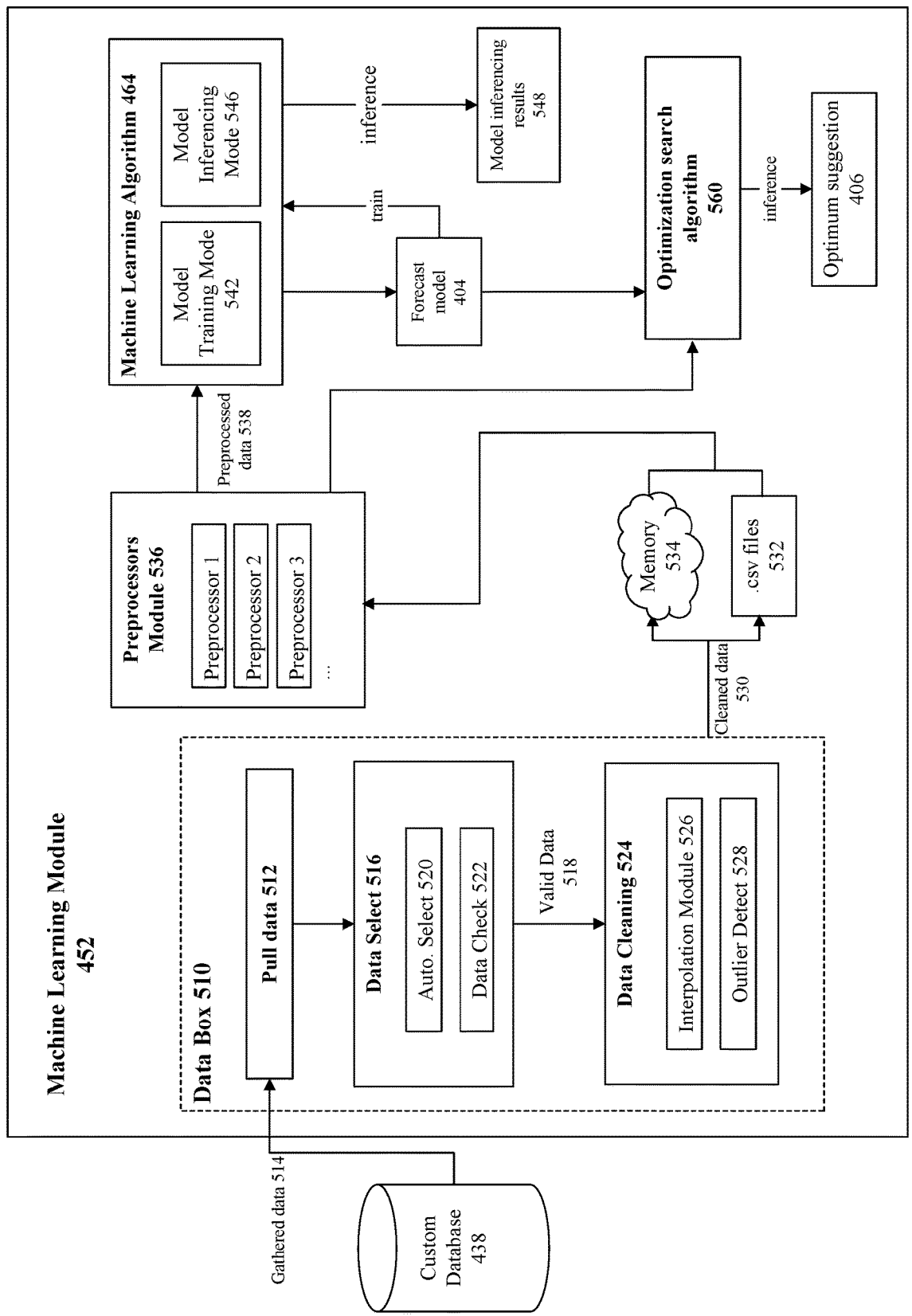
FIG. 6 illustrates a block diagram of a machine learning module for training a forecast model for controlling industrial process.
Figure 7:
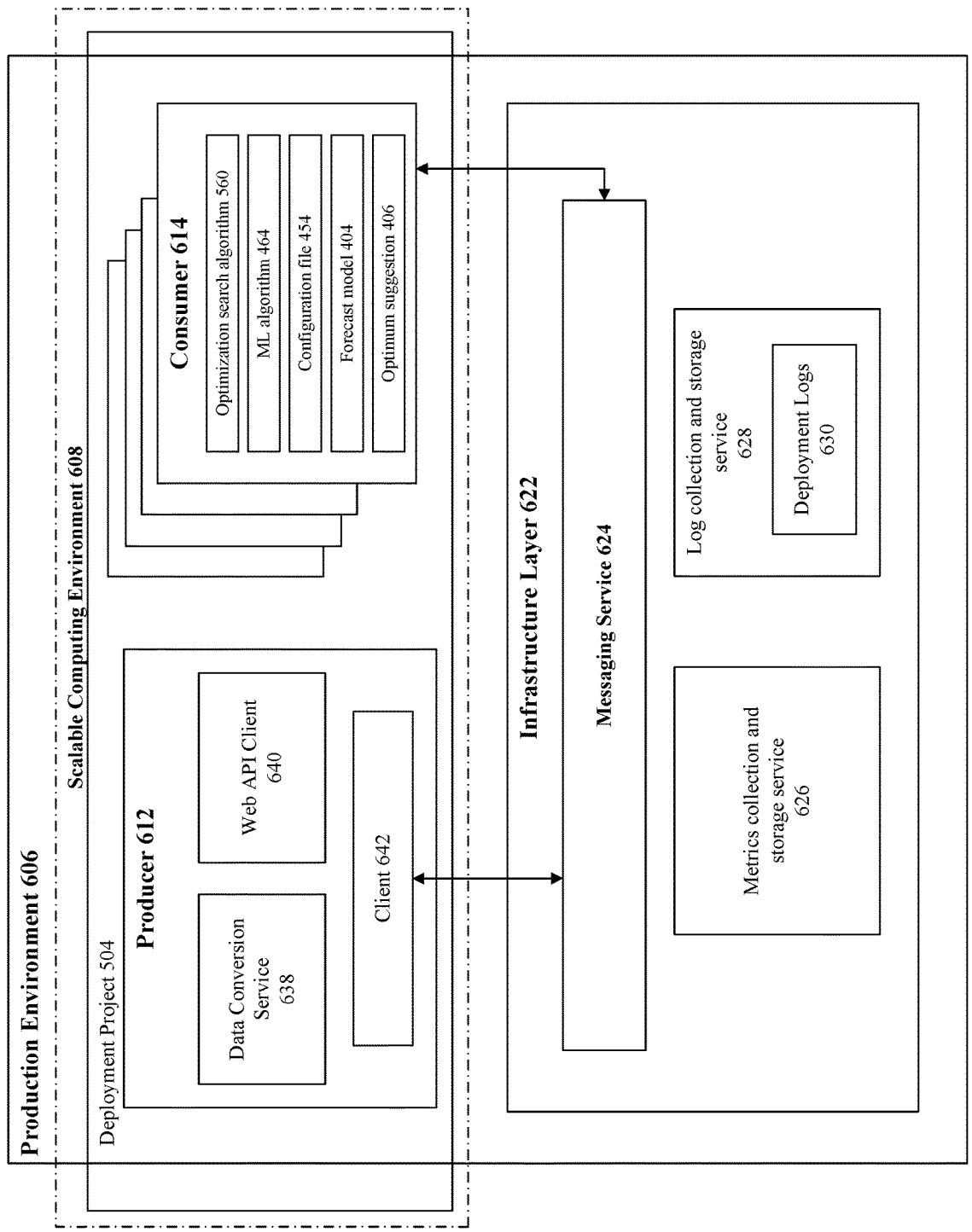
FIG. 7 illustrates a block diagram of a production environment for deploying a forecast model for controlling industrial process.

FIGS. 4 to 7 illustrate an example control system 400 for controlling industrial process, more particularly, FIG. 4 illustrates the overall system architecture of the system 400, FIG. 5 illustrates the machine learning environment 408 of the system 400, FIG. 6 illustrates the machine learning module 452 of the system 400, and FIG. 7 illustrates the production environment 606 of the system 400. The control system 400 may be used to implement a method for automated industrial process control, such as the method as illustrated in FIGS. 1 to 3.

Plant Database

The control system 400 includes plant database 412 for storing industrial process data 402 of customer. The plant database 412 may be a customer's database under customer control and local to customer plant. Each plant database 412 may be coupled to one or more plant control system 414 for controlling the running of industrial process.

The industrial process data 402 may include sensor data and control settings. The industrial process data 402 may include raw data that have not been processed and metadata associated with the raw data. The industrial process data 402 may be of variate formats depending on the data sources. For example, industrial process data 402 from different customers, plants, industrial processes, sensors and/or controllers may have different data formats, such as different data types and data structures.

In some implementations, the plant database 412 is a customer side PI system (short as plant PI system) which may include a suite of software for collecting, historicizing, organizing, storing, finding, analyzing, processing, delivering and/or visualizing industrial process data 402. The industrial process data 402 may be stored in the proprietary time-series database of the plant PI system, where data can be recorded, retrieved, or processed by time. As such, the plant PI system functions as both a database for storing past industrial process data 402 and a data historian for storing real-time industrial process data 402 (e.g., as time-series data).

The plant control system 414 may include various sensors such as sensors for sensing temperatures, pressures, flow rates, moisture contents, concentrations, particle sizes, purities, durations, distributions and/or emissions. The plant control system 414 may also include controllers for controlling the operation of the industrial process. The plant control system 414 may cause the industrial process data 402 to be stored in plant database 412. The plant control system 414 may also perform certain data processing such as tagging metadata to the raw industrial process data 402. In some implementations, the plant control system 414 may receive optimal suggestion 406 such as suggested or predicted optimal control parameters and operation parameters for controlling the industrial process from the control system 400, and in some implementations, the plant control system 414 may automatically and immediately act on the received optimal suggestion for controlling the running of the industrial process, such as adjusting various control settings of the industrial process.

ETL Module

The control system 400 may further include a data extract, transform, and load (ETL) module 424 configured to retrieve and transform the industrial process data 402 from the plant database 412 to a format the control system 400 can easily manipulate.

The ETL module 424 may include a timer/trigger/scheduler 426. The timer/trigger/scheduler 426 may control the timing of the data query, retrieval, and processing. The timer/trigger/scheduler 426 may be configured to continuously, periodically, or at occurrence of a triggering event trigger querying, retrieving, processing, storing, time stamping, and/or version stamping of data in the ETL module 424.

The ETL module 424 may include a replicate database 428. The replicate database 428 is configured to query and retrieve the industrial process data 402 from the plant database 412 and store a duplicate copy 430 of the retrieved industrial process data 402 in the replicate database 428.

The replicate database 428 and the plant database 412 are linked via a data link 432 such as a cloud connection or any other suitable data link, whether wireless or wired. In some implementations, the replicate database 428 is a system side PI (short as central PI system) that includes a suite of software for collecting, historicizing, organizing, storing, finding, analyzing, processing, delivering and/or visualizing the retrieved customer industrial process data 402. The central PI system stores data in its time-series database, and thus functions as both a database and a data historian. It is noted, although the replicate database 428 is only shown to be linked to a single customer database via a data link 432, the replicate database 428 may be linked to multiple customer databases via multiple data links 432, and may be configured to query and retrieve customer industrial process data 402 from multiple customer databases via the multiple data links 432.

The ETL module 424 may include a data integration submodule 434 configured to transform the industrial process data 402 stored in the replicate database 428, which may be in variate data formats, to an intermediate format that can be easily manipulated by the control system 400. In some implementations, the data integration submodule 434 is a .NET tool configured to efficiently extract the industrial process data 402 stored in the replicate database 428 and export them as .csv files 532. The .csv files 532 have fairly flat and simple schema, can be easily differentiated between numeric values and text, are faster to import, take less memory, and are easier to be programmatically manipulated.

The ETL module 424 may further include a data upload submodule 436 configured to upload the industrial process data 402 in the intermediate format to a custom database 438 in a custom schema. The custom schema may be developed for easy data query for forecast model 404 training, use case definition and forecast model 404 deployment. In some implementations, the custom database 438 is a PostgreSQL server and the data upload submodule 436 is a Python tool.

Tag Evaluation Service 440

The control system 400 may include a tag evaluation service 440 configured to evaluate and improve the quality of industrial process data 402. Data quality is critical for successful machine learning model training and model inferencing. Model training with defective data, such as noisy, erroneous, and incomplete data, may result in forecast model 404 that does not accurately capture system dynamics of the industrial process and has poor predictive ability, and model inferencing with defective data may result in erroneous model prediction or forecast, which can be disastrous, especially when the safe operation zone of the industrial process is narrow. Yet, raw industrial process data 402 often contain various defects, such as noise, errors, inconsistency, missing or incomplete data, and in some instances outlier data, and therefore need to be cleaned or processed before they can be used for model training or model inferencing.

The tag evaluation service 440 may include query submodule 442 configured to connect and execute queries on the custom database 438 to retrieve industrial process data 402 for evaluation and processing, and may store the resulting processing data such as metadata/tags/attributes associated with the data back into the custom database.

The tag evaluation service 440 may include a data evaluator 444. The data evaluator 444 may be configured to automatically evaluate and validate the quality of the industrial process data 402. The data evaluator 444 may be configured to automatically identify industrial process data 402 that can be used as training data 460 (e.g., training data set, validation data set) for forecast model 404 training or as deployment data 462 for forecast model 404 deployment (e.g., as input into forecast model 404 for model inferencing). In some implementations, the data evaluator 444 may be configured to automatically identify valid windows of industrial process data 402 across multiple tags, based on a sliding window approach and using several data criteria such as data being non-constant, not of low frequency (e.g., not below a low frequency threshold), or not of high frequency (e.g., not above a high frequency threshold). The reasoning is, if the data is constant, noisy, low frequency, or high frequency, then the data may be outlier or low-quality data and may not be usable for forecast model 404 training or inferencing, and thus should be excluded. Only data that is not constant, noisy, low frequency, nor high frequency are selected to be included in model training data set or model deployment input data forecast model 404 training or inferencing.

The data evaluator 444 may include a timer/trigger/scheduler 448 that controls the timing of data processing. The timer/trigger/scheduler 448 may trigger automatically, periodically, at prescheduled time, or at the occurrence of predefined condition to perform data evaluation and processing of the industrial process data 402 retrieved from the custom database 438.

The tag evaluation service 440 may also be linked to a tag evaluation graphical user interface 450 configured to allow user to validate data processing by the tag evaluation service 440. For example, the tag evaluation graphical user interface 450 may be configured to present the valid windows of industrial process data selections, exclusions and/or modifications for user to review, modify, and/or validate. The tag evaluation graphical user interface 450 may be a readable and writeable screen or a webpage assessable by user. User may be allowed to validate the data processing by accepting, rejecting and/or modifying the data processing. Since it is possible that the tag evaluation service 440 may erroneously exclude valid data, it is best for the customer to be the final decider. After user validates data processing (e.g., the windows of valid data selection) made by the tag evaluation service 440, the metadata associated with the data processing may then be stored back into the custom database 438 for later retrieval. The custom database 438 maintains windows of valid data (e.g., as metadata indicating the windows of valid data).

Machine Learning Environment

The control system 400 may include a machine learning environment 408 executing a machine learning pipeline which comprises a machine learning module 452, a model training controller 482, a model training interface 476, and a docker image repository 492.

(1) Machine Learning Module

The control system 400 may include a machine learning module 452 configured to train forecast model 404 and deploy forecast model 404 for inferencing. The forecast model 404 is trained to capture the system dynamics of the industrial process. The forecast model 404 can be used to predict or inference various parameters of the industrial process, such as optimal suggestion 406, such as the optimal control parameters and/or the operation parameters to achieve one or more operation objective(s), such as improved yield, better product quality, reduced cost, shorter production, and reduced emission, etc. The forecast model 404 may be a neural network-based machine learning model, such as a recurrent neural network such as a LSTM neural network.

Since system dynamics of industrial process may change over time, the forecast model 404 needs to be frequently retrained and updated using current industrial process data 402 to ensure its accuracy at all time. To ensure consistent model training and retraining, a configuration file 454 containing a set of model training configurations 456 is used as a single point of truth for guiding the forecast model 404 training using a machine learning algorithm 464. The configuration file 454 may additionally include other configurations such as model deployment configurations 506 (e.g., environment tags 494) for guiding forecast model 404 deployment.

The machine learning module includes pre-processing code for gathering and processing industrial process data 402. In some implementations, the pre-processing code may be configured to retrieve valid industrial process data 402 from custom database, and to process the selected industrial process data 402 prior to encoding it as training data 460 for training forecast model 404 and/or prior to encoding it as deployment data for forecast model 404 inferencing. The pre-processing code may automatically perform one or more data processing steps on the industrial process data 402, such as removing outliers, aligning data across multiple sensors/tags, and filling in missing data points. The pre-processing code may automatically identify and generate training data 460 for training a forecast model 404, and/or to automatically identify and generate deployment data 462 for forecast model 404 inferencing. The training data 460 and the deployment data 462 may be saved back to the custom database 438, for example as metadata indicating status of industrial process data 402 as valid industrial process data 402 that can be used as training data 460 for training a particular forecast model 404 and/or as deployment data 462 for performing model inferencing for a particular forecast model 404 may be saved back into the custom database 438.

Since system dynamics of the industrial process may change over time, it is important to train and retrain the forecast model 404 using the most current industrial process data 402 as training data 460 to ensure the forecast model 404 is always current and accurately captures the system dynamics of the industrial process. Further, it is also important to use the most current industrial process data 402 as deployment data 462 to ensure accurate forecast model 404 inferencing. As such, a pre-processing code (not shown) may constantly and automatically retrieve and process valid industrial process data 402 from the custom database 438, update training data and/or deployment data 462 so they include the most up to date industrial process data 402, and save information for the updated training data 460 and/or deployment data 462 back to the custom database 438 accordingly.

The machine learning module 452 may include a machine learning algorithm 464, which includes a model training mode 542 for training forecast model 404 and a model deployment mode 546 for model inferencing.

A configuration file 454 containing a set of machine learning model training configurations 456 may be used as a single point of truth for guiding the training of the forecast model 404 using the machine learning algorithm 464 without further human input. This way, fast and consistent training and retraining of the forecast model 404 with no or minimum human intervention may be achieved. This is particularly helpful for automating industrial process control, where forecast model 404 needs to be constantly retrained to adapt to rapid changes in the system dynamics.

The configuration file 454 may contain various model training configurations 456 such as machine learning workflow, pre-processing steps, post-processing steps, hyperparameters and hidden units in the machine learning model (e.g., in a LSTM regression model), input data, and/or optimization configuration. The configuration file 454 may be stored in a configuration file repository 480 in the model training interface 476 and forwarded to the machine learning module 452 at the request of the model training controller 482.

The training results 466 of the forecast model 404 training is a single set of optimal checkpoint 468, corresponding to an optimal version of the forecast model 404, trained across all epochs. Versions of checkpoints are stored in a checkpoint repository 470 for later retrieval to reconstruct the forecast model 404.

When used in model inferencing mode 546, the machine learning algorithm 464 performs forecast model 404 inferencing to produce model inferencing results 548. Forecast model 404 inferencing may be guided a set of model deployment configurations 506. The set of model deployment configurations 506 may be saved in the configuration file 454.

The machine learning module 452 includes an optimization search algorithm 560 configured to search through all dynamic space of forecast model 404 for optimal solutions. The search algorithm may be a genetic search algorithm. The inference results of the forecast model 404 may include optimal suggestion 406 such as optimal control parameters and optimal operation parameters for optimal running of the industrial process. The optimal suggestion 406 may be passed on to customer's plant control systems, via for example the replicate database 428 and the plant database 412.

The machine learning module may include a post-processing code (not shown) for processing the training results 466 or inferencing results 548 of the machine learning module 452, for example, further processing the training results 466 and inferencing results 548 so they can be organized, visualized, documented, interpreted, and/or explained.

The machine learning module may be executed at scale in a scalable computing environment 474, such as a computing cluster comprising of standard processing blocks. In some implementations, the machine learning module may be run at scale in a PoPtS Symphony cluster environment with scalable standard spark processing blocks, using a GitLab trigger for triggering the model training. The machine learning pipeline may be modeled as graphs and executed at scale within the cluster. Using scalable computing cluster frees users from using a separate computing device, such as a personal computer, for experimenting with and/or modeling the training model. In this way, if desired, the user may build, test, and/or fine tune a current training model using scalable processing blocks in a cluster via the machine learning module.

In some implementations, the machine learning module is a Python software package compatible to the model training interfaces. The Python software package contains data pre-processing and post-processing logics, TensorFlow code for training and inferencing, code for running an optimization search algorithm for optimizing the forecast model 404 (e.g., for optimizing the hyperparameter set) to predict the optimal hyperparameter set of the forecast model 404, and code for running an optimization search algorithm for searching the control space of the forecast model 404 to predict the optimal combination of control parameters and/or operation parameters of the industrial process for achieving one or more objectives. The optimization search algorithm may be a genetic algorithm based on natural selection that drives biological evolution, where the optimization search algorithm repeatedly selects and mutates winning population of individual solutions for the forecast model 404 until an optimal individual solution for the forecast model 404 is found.

Further details regarding how the machine learning module trains the forecast model 404 is discussed below in reference to FIG. 6.

Model Training Interface

The control system 400 may include a model training interface 476 for interfacing with the machine learning module 452. In some implementations, the model training interface 476 may comprise a set of standard machine learning interfaces 478, and a configuration file repository 480 for storing configuration file(s) 454 containing sets of machine learning model training configurations 456 for guiding forecast model 404 training, and a checkpoint repository 470 for storing checkpoints 468 for different versions of the forecast model 404.

(2) Model Training Controller

The control system 400 may include a model training controller 482 configured to control and validate the forecast model 404 training by the machine learning module 452. The model training controller 482 may run according to a timer/trigger/scheduler 484, periodically, or at occurrence of a predefined condition, or through a control line interface (CLI) (not shown). For example, the model training controller 482 scans, in the configuration file repository 480 in the model training interface 476, for any new configuration file 454 a user may have generated, submitted and/or requested for release. Upon receiving the new or updated configuration file 454, the model training controller 482 requests the current training data 460 to be sent from the custom database 438 to the machine learning module 452, initiates forecast model 404 training by the machine learning module 452 using the new or updated configuration file 454 and the current training data 460, which results in a single optimal checkpoint (e.g., a single best checkpoint) 468 trained across all epochs.

In some implementations, the model training controller 482 may automatically fine tune the forecast model 404 by creating permutations of machine learning configurations of the forecast model 404 and scheduling training of the forecast model 404 across the permutations of machine learning configurations to find the optimal performing machine learning configurations for training the forecast model 404. The optimal performing machine learning configurations should be able to consistently train accurate versions of forecast model 404 using different training data.

The model training controller 482 may perform validation test of forecast model 404. When a new version of forecast model 404 is trained, the performance metrics 467 of the new version of forecast model 404 tested on a validation data set is generated. The model training controller 482 may compare the performance metrics 467 of the new version of forecast model 404 with the performance metrics 467 of a previously approved performance metrics, resulting in a relative evaluation. If the difference in the performance metrics 467 is within a threshold range, the new version of forecast model 404 passes the relative evaluation. If the difference is outside of the threshold range, the new version of forecast model 404 may not pass the relative evaluation, since it will result in poor performance of the forecast model 404 in the optimization phase for predicting optimal control or operation parameters. Similarly, the new version of forecast model 404 may pass absolute evaluation if the performance metrics 467 of the new version of forecast model 404 is within a threshold range, otherwise, the new forecast model 404 may not pass absolute evaluation, since it does not give accurate prediction.

(3) Docker Image Repository

Versions of checkpoints 468 of forecast model 404s are stored in the checkpoint repository 470 of model training interface 476. The approved checkpoint 488 of a forecast model 404 is automatically published as a docker image 490 associated with the forecast model 404 and pushed to a central docker image repository 492 by the model training controller 482, either as auto-approved docker image 490 ready for deployment or awaiting approval by user (e.g. data scientist). Each forecast model 404 corresponds to a docker image 490 stored in the central docker image repository 492.

Users may tag the approved forecast model 404 with environment tags 494 to define the various forecast model 404 deployment parameters, through for example a user interface (not shown) of the model training controller 482. The environment tags 494 may be hierarchical, beginning from parameters defining development, then quality assurance, and then production. The environment tags 494 are then published as a part of the docker image 490 of the approved forecast model 404. Each approved forecast model 404 is associated with a docker image 490.

In some implementations, the model training controller 482 defines a producer 612 and consumer 614 for deploying the forecast model 404 and build the producer 612 and consumer 614 definitions into the docker image 490 of the forecast model 404 together with the approve checkpoints 488. The docker image 490 can later be used for guiding the deployment of the forecast model 404. Further details of the forecast model 404 deployment are discussed below.

Deploy Service

The control system 400 may include a deploy service 496 configured to deploy an approved forecast model 404 to a production environment 606 for model inferencing. The production environment 606 may be executed on a scalable computing environment 608, such as a PoPsS cluster. The deploy service 496 may comprise a timer/trigger/scheduler 498 for scheduling and triggering the execution of the deploy service 496, for example manually, automatically at prescheduled interval or at occurrence of predefined conditions.

When triggered to deploy a forecast model 404, the deploy service 496 may be configured to scan for the latest approved checkpoint 488 (e.g., saved as a docker image 490) of the forecast model 404. Once found, the deploy service 496 executes a deployment script 502 and makes various calls (e.g., Piper API calls) to create and deploy a deployment project 504 and updates model deployment configurations 506 of the deployment project 504 using the parameters stored in the docker image 490, and import the deployment project 504 into production environment 606. In some implementations, the deploy service 496 may be configured to allow users to manually update model deployment configurations 506 (e.g., user defined environment tags 494), such as the source of deployment data 462, deployment data 462 processing, and optimization search algorithm 560 parameters. The deployment project 504 includes a production copy of the forecast model 404 constructed using the retrieved approved checkpoint 488 of the forecast model 404. Additionally, the deployment project 504 defines how tag builder 410 will build tags, how a producer 612 will retrieve, process, and forward data from the replicate database 428 to generate deployment data 462, and how consumer 614 will receive and use the deployment data 462 from producer 612 to perform data processing and use the processed data for forecast model 404 inferencing using the production copy of the forecast model 404 recreated using the approved checkpoint 488 stored in the docker image 490.

The deploy service 496 triggers the execution of the tag builder 410, which is a set of tag creation scripts, to automatically create PI tags, PI AF hierarchical file structures, and PI vision-like dashboards for visualizing data stored in PI system.

The deploy service 496 may also include a model check 416 configured to further evaluate the quality of the forecast model 404 to be deployed, prior to running the deployment script 502 to deploy the forecast model 404 to the production environment 606. If the forecast model 404 passes the quality evaluation, the deploy service 496 proceeds to deploy the forecast model 404 to the production environment 606. If the forecast model 404 does not pass the quality evaluation, the deploy service 496 triggers the model training controller 482 to initiate the retraining of the forecast model 404.

The deploy service 496 may include a deployment rollback script 418 that supports deployment rollback with its ability to remove or replace the current docker image 490 in the project configuration file 454 with a previous docker image 490 stored in the central docker image repository 492, and redeploy the forecast model 404 with the new docker image 490 containing previously approved checkpoint 488 and model deployment configurations 506.

Production Environment

The production environment 606 executes a serving pipeline, which may include the producer 612, consumer 614, and an infrastructure layer 622, illustrated with more details in FIG. 7.

In some implementations, the infrastructure layer 622 may be Symphony infrastructure layer built on Kubernetes, and includes a messaging service 624 (e.g., Pulsar PubSub messaging service), a metrics collection and storage service 626 (e.g., Prometheus) for instrumenting code to publish metrics, a centralized log collection and storage service 628 (e.g., Fluent-IT) for collecting deployment logs 630 from all deployment projects 504. A distributed file system (not shown) may be used to store deployment logs 630.

The producer 612 is configured to dynamically and continuously assemble valid industrial process data 402 for use as deployment data 462 for forecast model 404 inferencing. The producer 612 may include a data conversion service 638 for converting the industrial process data 402 to the data streaming channel of the messaging service 624. In one example, the data conversion service converts the industrial process data 402 stored in the replicate database 428 from its PI websocket data streaming channel of the replicate database 428 to Pulsar data streaming channel of the messaging service 624.

The producer 612 may further include a web API client 640 for opening up the necessary Web Socket connections for tags read from the configuration file in the model deployment project 504 The producer knows from the consumer which Web Sockets to open. The producer 612 may further include a client 642 (e.g., a Symphony client) to publish and subscribe messages to topics within the messaging service 624.

The consumer 614 is configured to, using current industrial process data 402 as input, run an optimization search algorithm 560 (e.g., genetic algorithm or genetic search algorithm) to search through the all possible control spaces of the deployed forecast model 404 to find optimal suggestion 406 or predictions for achieving one or more objectives for industrial process control. In one example, the consumer 614 is configured to cache configurable window size of industrial process data 402 read from a topic stream of the message service data stream, and run a genetic search algorithm on a schedule (e.g. every 5 minutes) to search through the system dynamic space captured by the deployed instance of the forecast model 404 to find the optimal suggestion 406 and predictions for the optimal control of the industrial process, such as maximizing yield, minimizing emission, minimizing cost, etc. In some implementations, the industrial process data 402 read from the message service data stream may be sent from the replicate database 428. In some implementations, the industrial process data 402 read from the message service data stream may be valid industrial process data 402 from the custom database 438, where the valid industrial process data 402 have been processed (e.g. noise and outlier removed, data points aligned across multiple sensors/tags, and missing data filled in), so they are suitable for use by forecast model 404 to accurately inference or predict optimal suggestion 406 and predictions for controlling the industrial process to achieve one or more operation objectives.

In some implementations the configurations information needed during production or forecast model 404 deployment, such as the use case-specific tag configurations or environment tags 494 as a way of labeling checkpoints and defining deployment conditions for the checkpoints, message service topics and tag attributes/metadata are versioned and stored in the custom database 438 and retrieved during production time from the custom database 438. This allows for a central single source of industrial process data 402 record that is shared across all components of the control system 400 to prevent duplication and desynchronization.

Turning now to FIG. 6, it is the detailed view of the machine learning module 452 of FIGS. 4 and 5. The machine learning module may include a data box 510 linked to custom database 438. The data box 510 may include a pull data 512 configured to query and retrieve industrial process data 402 from custom database 438.

The data box 510 may include a data select 516 configured to select valid industrial process data (e.g., valid data) 518 from the gathered data 514. The data select 516 may include an automatic select 520 and a data check 522. The automatic select 520 may automatically identify and select windows of valid data 518 from the gathered data 514 across multiple tags, based on a sliding window approach and using multiple data criteria such as data being non-constant, not of low frequency, not of high frequency. The reasoning is, if the data is constant, noisy, of low frequency, or of high frequency, then the data may be outliers or low-quality data and may not be usable for forecast model 404 training or deployment, and thus should be excluded. Only data that are not constant, noisy, of low frequency, nor of high frequency are selected as model training data for training forecast model 404 and/or as model deployment data 462 for forecast model 404 deployment. The automatically selected windows of valid data 518 may be validated by user via the manual select (not shown). User may confirm, reject, and/or modify the auto-selected windows of valid data 518 via the manual select.

The data check 522 may be configured check the quality of the selected valid data 518. The data check 522 may also provide a user interface to allow user to view, validate, and/or modify the valid data 518. The valid data 518 may be presented to the user as valid industrial process data 446, which may comprise metadata indicating status of a data as valid data 518.

The data box 510 may include data cleaning 524 configured to clean the selected valid data 518. The data cleaning may include an interpolation module 526 configured to align the selected valid data 518 across multiple tags and fill in any missing data points through data interpolation, so that at each time step (or data entry) in a time-series, all sensors/tags have data present, and there are no missing data points. The rational is sensors/tags may have different sampling rates, causing the sensor data across different sensors/tags to be misaligned and have gaps. For example, at a particular time step in a time-series, one sensor/tag may have a data point while another sensor/tag may not have a data point. However, for the majority of machine learning model types, for training or deployment, the data need to be aligned and there should be no missing data points.

For example, data for four sensors are used as input to train a machine learning model, the training data at a given time step is a 4×4 table. There can be no missing data entries in the 4×4 table. However, the four sensors sampling at different time causes the sensor data from the four sensors to be misaligned. Having misaligned data or data with missing data points in the training data 460 will result in an inaccurate forecast model 404. Having misaligned data or data with missing data points in the deployment data 462 will also result in inaccurate forecast model 404 inferencing. For example, sensor A samples at 3:05, sensor B samples at 3:07, sensor C samples at 3:20, sensor D samples at 3:25. At time step 3:05, only sensor A has value, the other sensors do not have values, which means at this time step, the 4×4 table is missing 3 data entries. Majority of current machine learning models cannot tolerate missing data entries. To solve this problem, one way is to interpolate data entries for a sensor based on adjacent data entries for the sensor. For example, sensor B's data entry at time 3:05 can be interpolated using sensor B's data entries at time 2:45, 2:50, 3:05, 3:10, 3:15, 3:45 using an interpolation model, which can be any suitable model, such as a mean interpolation model or regression interpolation model.

The data cleaning may include outlier detect 528 configured to remove outliers from the clean data 530, such as spikes and peaks that may be caused by for example system oscillation. It is essential to remove these outlier data from the training data 460 for training forecast model 404 training and from the model deployment data 462 for deploying forecast model 404 to ensure accurate forecast model 404 training and inferencing.

The resulting cleaned data 530 from data cleaning 524 are saved as .csv files 532 and stored in memory 534. After that, the cleaned data 530 are processed by a preprocessor module 536, which may include one or more preprocessors, such as time-series processor, image processor, tabular data processor, speech signal processor, and text processor. The preprocessor module helps to make the machine learning module fully flexible and compatible with various types of data categories and ensures that the cleaned data 530 are compatible and readily usable for training machine learning model.

The resulting preprocessed data 538 from the preprocessor module 536 are used as input to a machine learning algorithm 464 for training a machine learning forecast model 404 or for performing machine learning forecast model 404 inferencing. The machine learning algorithm 464 may include a model training mode 542 for training machine learning forecast model 404, and a model inferencing mode 546 for performing model inferencing to produce model inferencing results 548. In one example, the machine learning algorithm 464 is a long-short term memory regression (LSTMregression) algorithm containing a LSTM algorithm and a regression algorithm. The LSTM algorithm may be a sequence domain algorithm. The regression algorithm may be various types of regression algorithm, such as a value regression algorithm and a classification regression algorithm.

When the machine learning algorithm 464 is used to train machine learning model 404, the machine learning algorithm 464 repeatedly trains the machine learning model 404 until the resulting model performance measured by performance metrics 467 meets predefined criteria. A satisfactorily trained machine learning forecast model 404 is saved as approved checkpoint 488 of the machine learning forecast model 404 published in a docker image 490 of the central docker image repository 492.

The preprocessed data 538 may also be used as input to the machine learning algorithm 464 to perform machine learning forecast model 404 inferencing using the model inferencing mode 546 of the machine learning algorithm 464. The inference results 548 may be predicted various parameters of the industrial process such as the optimal suggestion 406 for controlling industrial process.

The machine learning module may include an optimization phase 558 configured to automatically find a set of control parameters combination (e.g., a combination of flow rate, temperature, pressure, and running time) for controlling the operation of the industrial process that can best achieve an operation objective (e.g., maximizing yield, minimizing production cost, or minimizing emission) or a set of operation objectives defined for example by an objective function (e.g., a weighted function of a set of objectives such as maximizing yield, minimizing production cost, and minimizing emission) while remain in the safe operation zone. In some embodiments, the optimization search algorithm 560 is configured to automatically and repeatedly select and mutate winning population of control parameters combination sets until an optimal individual solution for the control parameters combination set (e.g., optimal suggestion 406) is found. The search for the optimal individual solution for the control parameters set may be constrained by the safe operation boundary and the operation objectives. The predicted optimal suggestion 406 may be forwarded to customer for controlling the operation of the industrial process. In some embodiments, the optimal suggestion 406 are forwarded to a plant control system 414 which automatically acts on the optimal suggestion 406 to control the running of the industrial process.

What is claimed:

1. A computer implemented method for controlling industrial process, comprising:
  deploying a forecast model to a production environment to predict an optimal suggestion for controlling an industrial process, wherein the forecast model is deployed with a set of model training configurations that can be used as a single point of truth for guiding training versions of the forecast model using a model training algorithm without human input;
  deploying a first version of the forecast model trained using the set of model training configurations to predict optimal suggestion for controlling the industrial process;
  monitoring the performance of the first version of the forecast model on current industrial process data of the industrial process;
  if the performance of the first version of the forecast model becomes unsatisfactory, retraining a second version of the forecast model on current industrial process data with the set of model training configurations as a single point of truth for guiding the forecast model training using the model training algorithm without human input;

deploying the second version of the forecast model to replace the first version of the forecast model to predict optimal suggestion for controlling the industrial process with the set of model training configurations;

wherein deploying a version of the forecast model to predict optimal suggestion for controlling the industrial process comprising using an optimization search algorithm to search through the dynamic space of the forecast model to arrive at an optimal set of control parameters for controlling the industrial process to achieve one or more operation objectives.

2. The method of claim 1, wherein the optimization search algorithm is a genetic search algorithm.

3. The method of claim 1, wherein using a version of the forecast model trained using the set of model training configurations to predict optimal suggestion for controlling the industrial process comprising:

gathering and processing industrial process data of the industrial process to generate forecast model deployment data;

predicting optimal suggestion for controlling the industrial process.

4. The method of claim 3, wherein the current industrial process data are processed prior to being used to monitor the performance of the forecast model by:

receiving current industrial process data from customer;

converting the received industrial process data to a common data format;

selecting windows of valid industrial process data from the industrial process data;

denoising the industrial process data; and aligning the industrial process data across multiple tags and filling in missing data points.

5. The method of claim 1, wherein the set of model training configurations is validated as one that can consistently train accurate forecast model.

6. The method of claim 5, wherein the set of model training configurations is validated by:

evaluating the performance of a plurality of versions of the forecast models trained on different model training data sets with the set of model training configurations as a single point of truth for guiding the forecast model training using a model training algorithm;

validating the set of model training configurations as can consistently train accurate forecast model if the prediction performance of the plurality of versions of the forecast model are satisfactory.

7. The method of claim 1, wherein the set of model training configurations are automatically generated using a genetic algorithm, wherein the genetic algorithm repeatedly select and mutate winning population of different sets of model training configurations until the set of model training configurations that can consistently train accurate forecast model is found.

8. The method of claim 1, wherein forecast model is a machine learning model and the set of model training configurations are a set of machine learning model training configurations.

9. The method of claim 1, wherein the optimal suggestion comprising one or more predicted optimal control parameters for controlling the running of the industrial process to achieve one or more operation objectives.

10. The method of claim 1, wherein the optimal suggestion comprising one or more predicted operation parameters of the industrial process.

11. A control system for controlling industrial process, the control system comprising:

one or more processors;

memory coupled to the one or more processors, wherein the memory is for storing instruction which, when executed by the one or more processors, cause the one or more processors to perform a method for controlling industrial process, the method comprising:

deploying a forecast model to a production environment to predict an optimal suggestion for controlling an industrial process, wherein the forecast model is deployed with a set of model training configurations that can be used as a single point of truth for guiding training versions of the forecast model using a model training algorithm without human input;

deploying a first version of the forecast model trained using the set of model training configurations to predict optimal suggestion for controlling the industrial process;

monitoring the performance of the first version of the forecast model on current industrial process data of the industrial process;

if the performance of the first version of the forecast model becomes unsatisfactory, retraining a second version of the forecast model on current industrial process data with the set of model training configurations as a single point of truth for guiding the forecast model training using the model training algorithm without human input;

deploying the second version of the forecast model to replace the first version of the forecast model to predict optimal suggestion for controlling the industrial process with the set of model training configurations;

wherein deploying a version of the forecast model to predict optimal suggestion for controlling the industrial process comprising using an optimization search algorithm to search through the dynamic space of the forecast model to arrive at an optimal set of control parameters for controlling the industrial process to achieve one or more operation objectives.

12. The control system of claim 11, wherein the optimization search algorithm is a genetic search algorithm.

13. The control system of claim 11, wherein using a version of the forecast model trained using the set of model training configurations to predict optimal suggestion for controlling the industrial process comprising:

gathering and processing industrial process data of the industrial process to generate forecast model deployment data;

predicting optimal suggestion for controlling the industrial process.

14. The control system of claim 13, wherein the current industrial process data are processed prior to being used to monitor the performance of the forecast model by:

receiving current industrial process data from customer;

converting the received industrial process data to a common data format;

selecting windows of valid industrial process data from the industrial process data;

denoising the industrial process data; and aligning the industrial process data across multiple tags and filling in missing data points.

15. The control system of claim 11, wherein the set of model training configurations is validated as that can consistently train accurate forecast model.

16. The control system of claim 15, wherein the set of model training configurations is validated by:
evaluating the performance of a plurality of versions of the forecast models trained on different model training data sets with the set of model training configurations as a single point of truth for guiding the forecast model training using a model training algorithm;
validating the set of model training configurations as can consistently train accurate forecast model if the prediction performance of the plurality of versions of the forecast model are satisfactory.

17. The control system of claim 11, wherein the set of model training configurations are automatically generated using a genetic algorithm, wherein the genetic algorithm repeatedly select and mutate winning population of different sets of model training configurations until the set of model training configurations that can consistently train accurate forecast model is found.

18. The control system of claim 11, wherein the forecast model is a machine learning model and the set of model training configurations are a set of machine learning model training configurations.

19. The control system of claim 11, wherein the optimal suggestion comprising one or more predicted optimal control parameters for controlling the running of the industrial process to achieve one or more operation objectives.

20. A non-transitory computer-readable storage medium encoding computer executable instructions that, when executed by at least one processor, performs a method for a control system for controlling industrial process, the method comprising:

deploying a forecast model to a production environment to predict an optimal suggestion for controlling an industrial process, wherein the forecast model is deployed with a set of model training configurations that can be used as a single point of truth for guiding training versions of the forecast model using a model training algorithm without human input;
deploying a first version of the forecast model trained using the set of model training configurations to predict optimal suggestion for controlling the industrial process;
monitoring the performance of the first version of the forecast model on current industrial process data of the industrial process;
if the performance of the first version of the forecast model becomes unsatisfactory, retraining a second version of the forecast model on current industrial process data with the set of model training configurations as a single point of truth for guiding the forecast model training using the model training algorithm without human input;
deploying the second version of the forecast model to replace the first version of the forecast model to predict optimal suggestion for controlling the industrial process with the set of model training configurations;
wherein deploying a version of the forecast model to predict optimal suggestion for controlling the industrial process comprising using an optimization search algorithm to search through the dynamic space of the forecast model to arrive at an optimal set of control parameters for controlling the industrial process to achieve one or more operation objectives.

* * * * *